US006971825B2

(12) United States Patent
Stojanovski

(10) Patent No.: US 6,971,825 B2
(45) Date of Patent: Dec. 6, 2005

(54) MILLING TOOL HOLDER WITH DIFFERENTIAL SCREW

(76) Inventor: Stojan Stojanovski, 13300 W. Star Dr., Shelby Township, MI (US) 48315

(*) Notice: Subject to any disclaimer, the term of this patent is extended or adjusted under 35 U.S.C. 154(b) by 130 days.

(21) Appl. No.: 10/693,418

(22) Filed: Oct. 27, 2003

(65) Prior Publication Data

US 2005/0147479 A1 Jul. 7, 2005

(51) Int. Cl.[7] .................................................. B23C 1/00

(52) U.S. Cl. .......................... 409/233; 409/232; 279/8; 408/239 A

(58) Field of Search ................................ 409/233, 232, 409/231, 234; 408/239 R, 238, 239 A; 279/8, 279/143, 145; 82/158, 159, 160; 403/373, 403/374.1, 374.2, 374.3, 374.4; 411/60.2, 411/55, 57.1, 271, 325

(56) References Cited

U.S. PATENT DOCUMENTS 4,557,642 A * 12/1985 Dudas et al. ........... 408/239 R
4,777,715 A * 10/1988 Roberts ...................... 409/233
4,856,944 A * 8/1989 Reinauer ....................... 279/8
5,193,954 A * 3/1993 Hunt .......................... 409/233
5,354,076 A * 10/1994 Yeo et al. .................. 409/233
5,447,485 A * 9/1995 Bory et al. ................. 409/233
5,795,114 A * 8/1998 Schweizer et al. .......... 409/233
5,971,681 A * 10/1999 Wolfe et al. ................ 409/233
6,264,409 B1 * 7/2001 Date et al. .................. 409/233
6,287,059 B1 * 9/2001 Hashidate et al. .......... 409/233
6,533,507 B2 * 3/2003 Sailing ....................... 409/233

* cited by examiner

*Primary Examiner*—A. L. Wellington
*Assistant Examiner*—Dana Ross
(74) *Attorney, Agent, or Firm*—Charles W. Chandler

(57) ABSTRACT

A milling tool holder having a spindle with a tapered opening and a tool holder having a tapered shank that fits into the spindle opening. The narrow end of the shank has a split collar. The spindle is joined to the tool holder by inserting the shank into the tapered opening and drawing the two components together using a differential screw. When the differential screw is turned in one direction, the two components are drawn together, and when turned in the opposite direction, the two components are separated. As the shank bottoms in the tapered opening, an annular enlargement on the differential screw expands the split collar of the shank to tightly seat the shank in the spindle.

11 Claims, 3 Drawing Sheets

MILLING TOOL HOLDER WITH DIFFERENTIAL SCREW

BACKGROUND OF THE INVENTION

BACKGROUND AND SUMMARY OF THE INVENTION

Tool holders for milling tools commonly employ a tool holding component having a shank, and a driven spindle having an opening for receiving the shank. Various ways are known in the prior art for tightly joining the spindle to the shank of the tool holder. However, most commonly used apparatus still tend to permit the tool to chatter from the tool movement such as when using a hydraulic pull system with a retention hub. Further such apparatus sometimes permit tool deflection which results in a poorly finished workpiece.

The broad purpose of the present invention is to provide an improved tool holder combination comprising an elongated tool holder having a threaded bore, one end for supporting a milling tool and its opposite end having a tapered shank. The wide end of the shank merges with an annular seat on the tool holder. The narrow end of the shank merges with a generally cylindrical split collar having two axial slots that permit the split collar to be enlarged in diameter.

The spindle has a frusto-conical opening for receiving the tapered shank, and an inner bore which extends between the frusto-conical opening and a narrow threaded bore at the rear end of the spindle.

A differential screw is installed between the threaded bore of the shank and the threaded of the spindle bore, and then rotated by inserting a wrench through the spindle bore. The differential screw has threads formed in one direction on the shank end, and threads formed in the opposite direction on the spindle in such a manner that when the differential screw is rotated by the wrench, the screw draws the two components together. As the screw is being rotated, the split collar of the shank is received into the bore of the spindle until the end face of the spindle is firmly seated on an annular seat on shank.

As the shank bottoms out in the spindle opening, an enlargement on the differential screw spreads the split end of the shank to tightly wedge the shank in the spindle smooth bore. Thus the shank and the tool holder are tightly joined together because the end face is fully seated on the annular seat, the split collar is wedged in the spindle bore and the threaded end of the screw is tightly engaged in the threaded bore of the spindle.

Still further objects and advantages of the invention will become readily apparent to those skilled in art to which invention pertains on reference to the following detailed description:

DESCRIPTION OF THE DRAWINGS

The description refers to the accompanying drawings in which like reference characters refer to like parts throughout the several views and which.

DESCRIPTION OF THE PREFERRED EMBODIMENT

Figure 1:
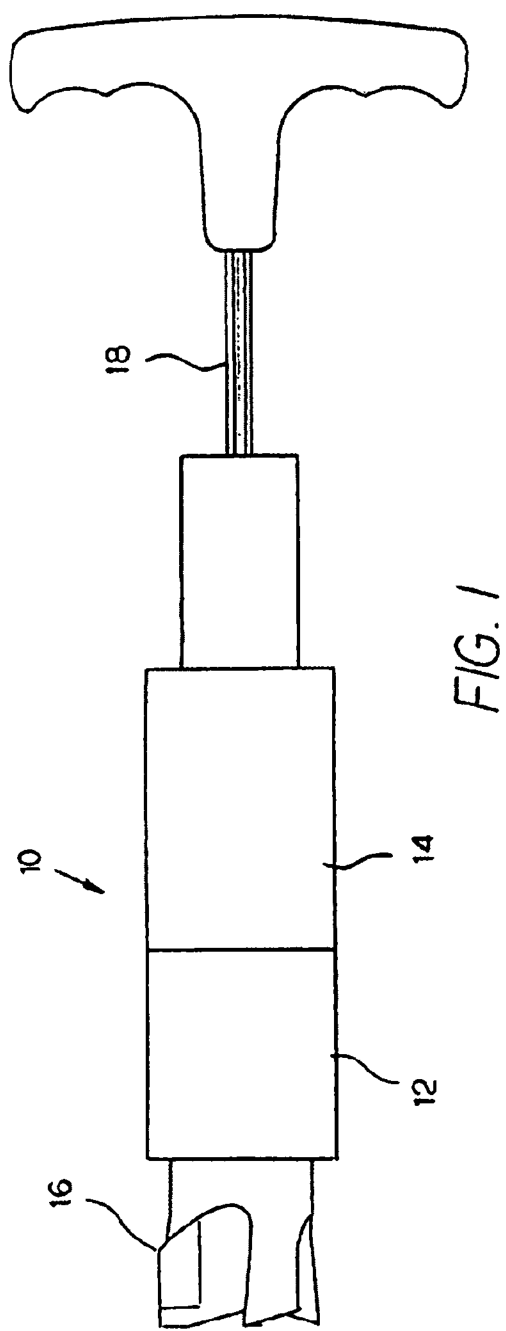
FIG. 1 illustrates a the shank coupled to a spindle and showing the tool engaging the internal, differential screw.

Referring to the drawings, FIG. 1 illustrates a preferred tool holder combination 10 which comprises a tool holder 12 joined to a spindle 14. A milling tool 16 is an integral element of the tool holder. An elongated hexagonal wrench 18 is illustrated mounted inside the spindle for purposes which will be described. The spindle is adapted to be driven by a rotating drive means, not shown.

Figure 2:
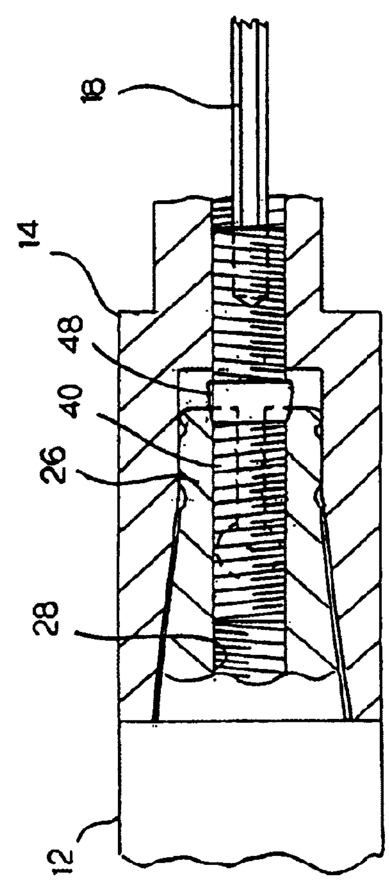
FIG. 2 is a longitudinal sectional view showing the shank as it approaches the bottom of the tapered opening.

Referring to FIG. 2, tool holder 12 comprises a body 20. A tapered shank 21 forms an integral part of the inner end of the tool holder body with the wide end of the shank terminating in an annular seat 22. In use, the shank and the tool holder body rotates about an axis of rotation 24.

Figure 3:
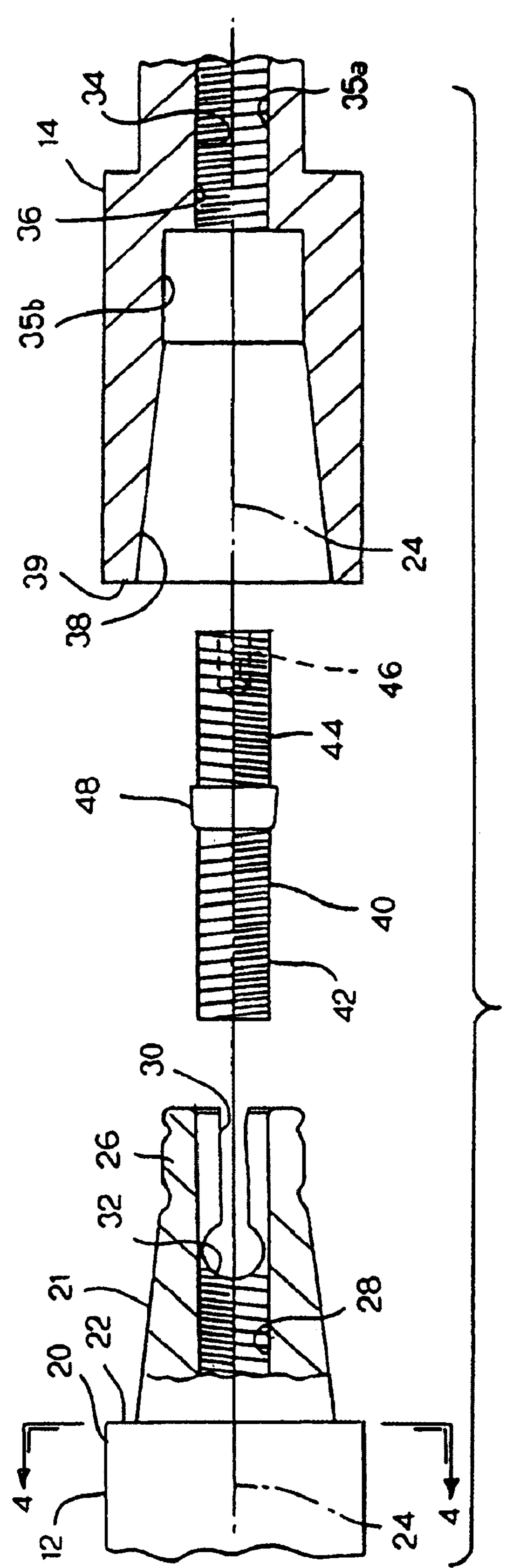
FIG. 3 is an exploded view showing the tool holder, the differential screw, and the spindle.
Figure 4:
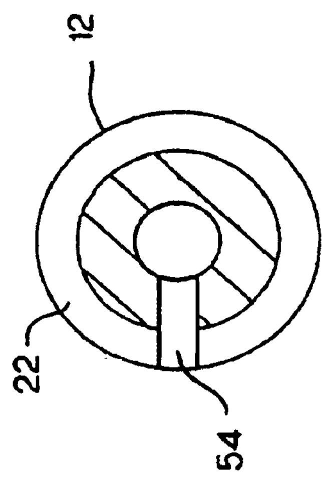
FIG. 4 is an enlarged view as seen along lines 4—4 of FIG. 3.

The tapered shank terminates in a collar 26. The shank has an internal threaded bore 28, and a smooth bore in the collar. A pair of axial running slot means 30 are formed in the collar in such a manner that the two halves of the collar can be expanded from their normal position illustrated in FIG. 3. Each slot terminates in a partially cylindrical opening 32. Opening 32 has a greater diameter than the distance between the two halves of the collar.

Spindle 14 has a bore 34 formed along the turning axis 24 of the tool holder combination. The outer end of the bore at 35*b* is smooth, the intermediate section is threaded at 35*a*, and the inner end of the bore at 35*b* is smooth and enlarged. The internal threads of the spindle are formed in the opposite hand with respect to the hand of the internal threads 28 of the tool holder shank. The spindle has a frusto-conical seat 38 tapered to receive the shank to a position in which the outer annular end face 39 of the spindle is tightly and fully seated against annular seat 22 of the tool holder.

A differential screw 40 has a threaded section 42 adapted to be threadably received within the threaded section of tool holder bore 28. Screw 40 has an opposite threaded end 44 receivable into the spindle's threaded bore 36. The threads of end 42 are formed in the opposite direction with respect to threads 44 so that turning the screw in one direction, draws the spindle toward the tool holder until the tapered shank is received into tapered seat 38, as illustrated in FIG. 2. Turning the differential screw in the opposite direction separates the spindle from the tool holder shank. The screw has an internal hexagonal bore 46 which receives the hexagonal end of wrench 18 so that the screw can be rotated in either direction.

As the shank approaches its fully seated position in which the end face of the spindle engages annular seat 22, an annular camming collar 48 on the screw having a diameter slightly larger than the unstressed diameter of split collar 26, engages the inside surface of the collar. Camming collar 48 enters the split collar causing it to enlarge in spindle bore section 35*b* as the screw is being turned. The split collar expands until the shank is tightly wedged inside the inner end of the spindle bore at 35*a*. The expansion of this split end is such that it firmly seats the shank in tapered seat 38.

The screw is tightened by the wrench until there is a firm connection at three points, that is, between annular seat 22 and the end face of the spindle, the wedged position of the split collar 26, and the threads of the differential screw in threaded bore 34 of the spindle.

Figure 5:
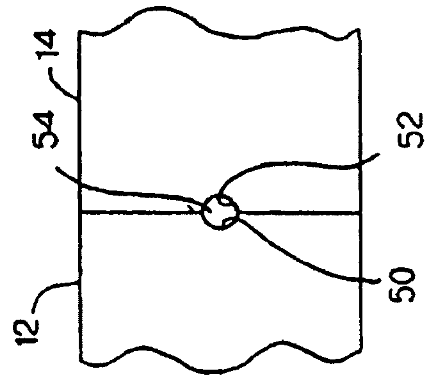
FIG. 5 is an enlarged view showing a pin that prevents rotation of the tool holder with respect to the spindle.

Referring to FIG. 5, the tool holder has a semi-cylindrical radial groove 50 in annular seat 22. The spindle also has a semi-cylindrical radial groove 52 in the outer face of the spindle terminating in an internal bore 53. Pin 54 is press fitted in bore 53. The two radial grooves are rotated to a face-to-face position, and drawn together to encircle the two grooves. The pin prevents any rotation of the spindle with respect to the tool holder, for work requiring a heavy cut. A lighter cut does not require pin 54.

Figure 6:
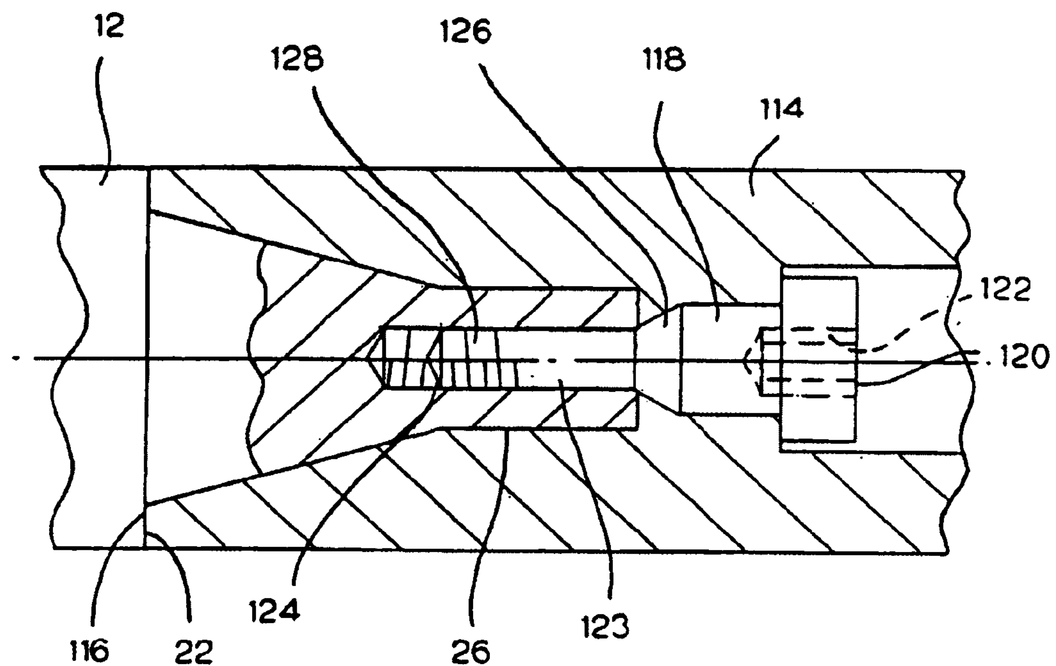
FIG. 6 is a sectional view illustrating another embodiment of the invention.

FIG. 6 illustrates another embodiment of the invention for connecting a spindle 114 to body 12. In this case, the spindle body also has an annular face 116 which seats against the annular seat 22 when the spindle and the tool head are fully engaged. Instead of using a differential screw, a screw 118 having a head 120 with a hexagonal opening 122 is used for receiving the wrench. The screw has a cylindrical unthreaded portion attached to the head and an intermediate smooth portion 122 which is received inside of collar 12. The outer end of screw 124 is threaded at 128. The screw also has a tapered camming section 126 that is located so that as the shank approaches its fully seated position, the camming section 126 enlarges the split collar on the shank so as to tightly wedge the split collar in the spindle opening.

Screw 120 connects the spindle to the tool body by screwing the screw in one direction so that it is threadably engaged in threaded bore 124. Another contact point is between the threaded end of the screw and the inner threaded bore of the spindle. The shank is fully seated when the outer face 116 of the spindle is tightly seated on annular seat 22.

Thus, it is to be understood that I have described an improved tool holder mechanism for connecting a spindle to a tool holder of the type having a tapered shank received in a frusto-conical opening in the spindle. The preferred mechanism provides a full metal-to-metal contact between the spindle and the tool holder at three different locations. The first is between the annular seat on the tool holder and the outer face of the spindle. The second is between the split end of the tool holder wedged into contact with the spindle bore. The third is between the differential screw and the spindle. The preferred embodiment of the invention provides better control by the user over the tool, prevents tool chatter, and prevents any distortion caused by a misalignment of the cutting tool.

The differential screw may be replaced by a cap screw having its head connected to the spindle, and an opposite end threadably connected to the tool holder bore.

Having described my invention, I claim:

1. A tool holder apparatus comprising:

an elongated spindle adapted to be rotated about a turning axis, and having an internally tapered opening at one end thereof connected to an internally threaded bore formed along said turning axis;

an elongated tool holder having a first end for supporting a cutting tool in a cutting position, and an externally tapered shank complementary to and receivable in the tapered opening of the spindle;

the tool holder having a threaded bore with a threaded section opening to the end opposite the cutting position of a tool;

the tool holder having a radially expandable collar adjacent said shank and joined to said shank;

the threaded bore of the tool holder and the internally threaded bore of the spindle having opposite hand threads;

a screw having a first externally threaded section threadably receivable in the internally threaded bore of the spindle, and a second externally threaded section threadably receivable in the threaded bore of the tool holder, such that as the screw is turned in a first direction about said turning axis, the tool holder is moved toward the spindle and as the screw is turned in the opposite direction, the tool holder is moved away from the spindle camming structure on the screw engageable with the radially expandable collar of the tool holder to expand the radially expandable collar thereof to engage and wedge the tool holder radially expandable collar in the spindle opening for a cutting motion.

2. A tool holder apparatus as defined in claim 1, including means for preventing relative rotation between the tool holder and the spindle when the tapered shank is inserted into the tapered opening of the spindle.

3. A tool holder apparatus as defined in claim 1, in which the tool holder has an annular seat around the turning axis, and the screw moves the tool holder along said turning axis so that said annular seat on the tool holder has pressure engagement with an end face of the tool holder.

4. A tool holder as defined in claim 2, wherein the rotation-preventing means comprises a pin-receiving opening in the spindle, facing a pin-receiving opening in the tool holder, and including a pin disposed in both of said pin-receiving openings to prevent the tool holder from turning about said turning axis with respect to the spindle.

5. A tool holder as defined in claim 4, in which the pin-receiving opening in the tool holder is disposed in a radial direction and intersects an annular seat of the tool holder, and the pin-receiving opening in the spindle is disposed in a radial direction and intersects an end face of the spindle.

6. A tool holder apparatus as defined in claim 1, in which the camming structure comprises an annular camming collar located on the screw between the first threaded section and the second threaded section.

7. A tool holder apparatus as defined in claim 1, in which the tool holder carries an integrally mounted tool for a cutting motion.

8. A tool holder apparatus as defined in claim 1, in which the screw has an end with a wrench-receiving opening, and the spindle bore provides access through the spindle for a wrench to engage and turn the screw along said turning axis.

9. A tool holder apparatus comprising:

an elongated spindle adapted to be rotated about a turning axis, and having an internally tapered opening at one end thereof connected to a bore extending from said tapered opening to the opposite end of the spindle along said turning axis, at least a portion of said bore being internally threaded;

an elongated tool holder having a first end for supporting a cutting tool in a cutting position, and an externally tapered shank at an intermediate portion thereof, complementary to and receivable in the tapered opening of the spindle;

the tool holder having a threaded bore with a threaded section and opening in the end opposite said first end;

the tool holder having a radially expandable collar adjacent said shank;

a screw having a first end rotatably connected to the spindle, and a second end threadably receivable in the tool holder bore; and camming structure on the screw engageable with the radially expandable collar of the tool holder to expand the radially expandable collar thereof to engage and wedge the tool holder shank in the spindle for a cutting motion.

10. A tool holder apparatus as defined in claim 9, in which the radially expandable collar of the tool holder comprises;

the tool holder having a pair of axially running slots, and a transverse opening, the slots each having a first end opening to said transverse opening and a second end opening to the end of the tool holder opposite said first end, the transverse opening having a diameter greater than the width of the slots.

11. A tool holder apparatus as defined in claim 10 in which the camming structure on the screw has a diameter greater than the width of the slots such that axial motion of the camming structure expands the diameter of the radially expandable collar.

* * * * *